United States Patent
Ross

(10) Patent No.: US 8,701,119 B1
(45) Date of Patent: Apr. 15, 2014

(54) PARSING XML IN SOFTWARE ON CPU WITH MULTIPLE EXECUTION UNITS

(75) Inventor: Richard A. Ross, Weston, CT (US)

(73) Assignee: Richard A. Ross, Weston, CT (US)

( * ) Notice: Subject to any disclaimer, the term of this patent is extended or adjusted under 35 U.S.C. 154(b) by 1127 days.

(21) Appl. No.: 12/198,945

(22) Filed: Aug. 27, 2008

Related U.S. Application Data

(60) Provisional application No. 60/968,543, filed on Aug. 28, 2007, provisional application No. 60/974,681, filed on Sep. 24, 2007.

(51) Int. Cl.
*G06F 9/46* (2006.01)
*G06F 17/00* (2006.01)
*G06F 17/30* (2006.01)

(52) U.S. Cl.
USPC .............. 718/104; 707/755; 715/234; 712/32

(58) Field of Classification Search
USPC .................. 707/513, 755; 718/102, 105, 104; 709/207, 217; 717/104, 114, 136, 149; 726/12; 1/1; 719/330; 712/32; 715/234
See application file for complete search history.

(56) References Cited

U.S. PATENT DOCUMENTS

| | | | |
|---|---|---|---|
| 6,304,866 B1 * | 10/2001 | Chow et al. ........................... | 1/1 |
| 6,826,753 B1 * | 11/2004 | Dageville et al. ............. | 718/102 |
| 6,986,140 B2 * | 1/2006 | Brenner et al. ............... | 718/105 |
| 7,437,740 B1 * | 10/2008 | Koerber et al. ............... | 719/330 |
| 7,536,681 B2 * | 5/2009 | Nagendra ..................... | 717/136 |
| 7,685,254 B2 * | 3/2010 | Pandya ......................... | 709/217 |
| 7,774,831 B2 * | 8/2010 | Kuznetsov et al. ............. | 726/12 |
| 8,347,301 B2 * | 1/2013 | Li et al. ........................ | 718/104 |
| 2002/0038320 A1 * | 3/2002 | Brook ........................... | 707/513 |
| 2002/0073399 A1 * | 6/2002 | Golden ......................... | 717/114 |
| 2003/0023633 A1 * | 1/2003 | Ross ............................. | 707/513 |
| 2004/0205694 A1 * | 10/2004 | James et al. .................. | 717/104 |
| 2004/0230660 A1 * | 11/2004 | Abjanic et al. ................ | 709/207 |
| 2006/0136570 A1 * | 6/2006 | Pandya ......................... | 709/217 |
| 2008/0127145 A1 * | 5/2008 | So et al. ....................... | 717/149 |
| 2009/0089658 A1 * | 4/2009 | Chiu et al. .................... | 715/234 |
| 2009/0228686 A1 * | 9/2009 | Koenck et al. ................. | 712/32 |
| 2012/0303640 A1 * | 11/2012 | Chamarthy ................... | 707/755 |

OTHER PUBLICATIONS

Wei Lu et al, "A parallel Approach to XML Parsing",Aug. 6, 2006, IEEE, p. 223-230.*

* cited by examiner

*Primary Examiner* — Thomas Lee
*Assistant Examiner* — Aurel Prifti
(74) *Attorney, Agent, or Firm* — North Shore Patents, P.C.; Michele Liu Baillie

(57) ABSTRACT

An improved method for parsing XML data or NVP data in software is disclosed. The method takes advantage of some modern processors' architecture which has multiple execution units. The multiple execution units allow multiple processing loops to occur in parallel. Instructions can be ordered so that the maximum delay in finishing a task is determined by the execution unit with the most processing to perform. Corresponding cycles in the remaining execution units can then be filled to perform other operations in parallel.

6 Claims, 3 Drawing Sheets

PARSING XML IN SOFTWARE ON CPU WITH MULTIPLE EXECUTION UNITS

CROSS-REFERENCE TO RELATED APPLICATIONS

This application claims priority to U.S. provisional patent application entitled "Parsing XML in Software on CPU with Multiple Execution Units", Ser. No. 60/968,543, filed on Aug. 28, 2007, and to U.S. provisional patent application entitled "Parsing XML or NVP Data in Software on CPU with Multiple Execution Units", Ser. No. 60/974,681, filed on Sep. 24, 2007.

BACKGROUND OF THE INVENTION

1. Field

The present invention relates to the parsing of XML and name-value pair (NVP) data in a computer system, and more particularly to the parsing of XML and NVP data in software on CPU's with multiple execution units.

2. Related Art eXtensible Mark-up Language (XML) is a simple, easy, and open data protocol that describes content, and is often used for web services. However, XML is a verbose language for data, with space requests often two to twenty times the size of the underlying binary data. One of its main limitations is that the parsing of XML data in software requires significant resources, several times more than many other types of data. Processing resources can be scarce, particularly in systems such as handheld devices or mobile phones. Servers also may have limited resources and/or time constraints for XML parsing.

Some prior art approaches to XML data parsing is to perform the parsing using hardware, or more specifically, application specific integrated circuits (ASIC). Although XML data parsing using hardware provides the advantage of speed, this approach in inflexible. Changes to the parsing process would require replacing or upgrading the ASIC, which can require a significant amount of time. Thus, parsing XML in software can be preferable.

Prior art methods of parsing XML in software perform the following processing loops in a sequential manner: (1) scanning for delimiter(s); (2) copying characters of a string into a buffer; (3) checking the characters of the string for well-formedness; (4) calculating a hash value for the string; (5) copying the string to a hash table; and (6) copying the string to an output stream. The sequential nature of these loops requires a significant number of cycles, causing delay in finishing a task.

Name-value pairs (NVP) format is another common protocol with which to transmit data and describe content, though frequently not as verbose as XML. As simple as this format is, it can still require significant Central Processing Unit (CPU) cycles to parse NVP data.

As with XML, prior art methods of parsing NVP data in software perform the following processing loops in a sequential manner: (1) scanning for delimiter(s); (2) copying characters of a string into a buffer; (3) checking the characters of the string for well-formedness; (3) calculating a hash value for the string; (4) copying the string to a hash table; and (5) copying the string to an output stream. The sequential nature of these loops requires a significant number of cycles, causing delay in finishing a task.

Accordingly, there exists a need for a method for improving the efficiency of parsing XML data or NVP data in software. The present invention addresses such a need.

BRIEF SUMMARY OF THE INVENTION

An improved method for parsing XML data or NVP data in software is disclosed. The method takes advantage of some modern processors' architecture which has multiple execution units. The multiple execution units allow multiple processing loops to occur in parallel. Instructions can be ordered so that the maximum delay in finishing a task is determined by the execution unit with the most processing to perform. Corresponding cycles in the remaining execution units can then be filled to perform other operations in parallel.

DETAILED DESCRIPTION OF THE INVENTION

The method for parsing XML data or NVP data in software in accordance with the present invention takes advantage of some modern processors' architecture which comprises multiple execution units. An "execution unit", as used in this Specification, refers to a part of a central processing unit (CPU) that performs lower level operations and/or calculations called for by the assembly language instructions of a software program. In other words, one assembly language instruction is divided into several pieces, or "microinstructions", for operations required by a task in the parsing of a document. A programmer writes code which orders the operations for parsing tasks with the goal of minimizing latency and maximizing throughput and performance. To accomplish this, the programmer may determine the maximum delay for the execution unit with the most processing to perform. The programmer than orders the operations in the code so that corresponding cycles in the remaining execution units are filled to perform other operations in parallel. The operations for the different tasks are likely interleaved. When the code is executed, the operations are provided to a scheduler in the order in which they were coded. The scheduler receives the operations in the order in which they were coded and divides the operations into microinstructions. The microinstructions may be re-ordered by the scheduler as needed based on inter-operation dependencies and the states of the execution units. The microinstructions are then assigned to the various execution units by the scheduler. In this way, how the microinstructions are assigned to the execution units is controlled by the order of the operations in the code.

Figure 1:
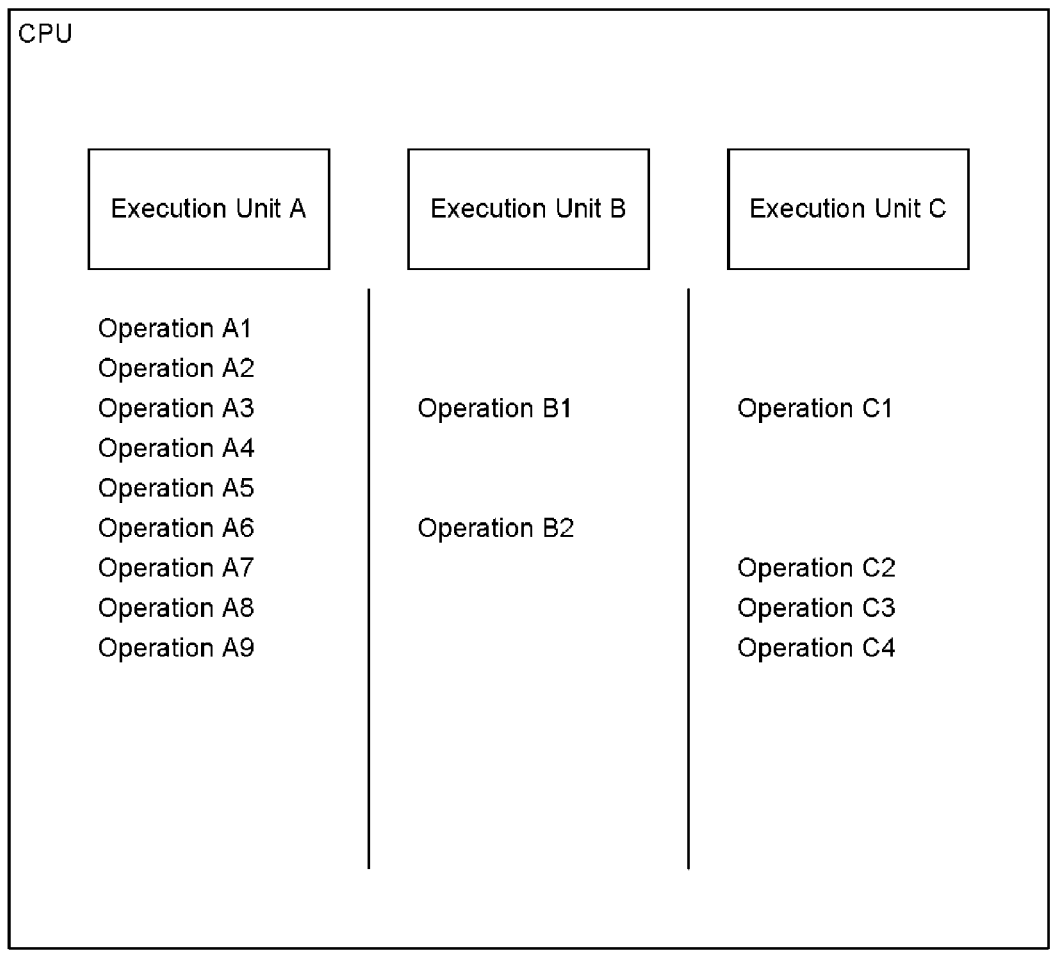
FIG. 1 illustrates the method for parsing XML data or NVP data in software in accordance with the present invention.

FIG. 1 illustrates a method for parsing XML data or NVP data in software in accordance with the present invention. The method utilizes multiple execution units (Execution Unit A, Execution Unit B, and Execution Unit C) to perform multiple processing loops in parallel. Execution Unit A performs operations A1 through A8 for a first task. Execution Unit B performs operations B1, B2 and B3 for a second task. Execution Unit C performs operations C1 through C4 for a third task. Note that the boxes showing the operations in FIG. 1 indicate relative starting times of the operations, but not necessarily ending times or operation durations. Assume that Execution Unit C has the most processing to perform. While Execution Unit C is performing an operation, such as operation C2, the corresponding cycles in Execution Unit A can be filled to perform other operations in parallel. Thus, more operations are processed without increasing the delay in finishing the task.

Figure 2:
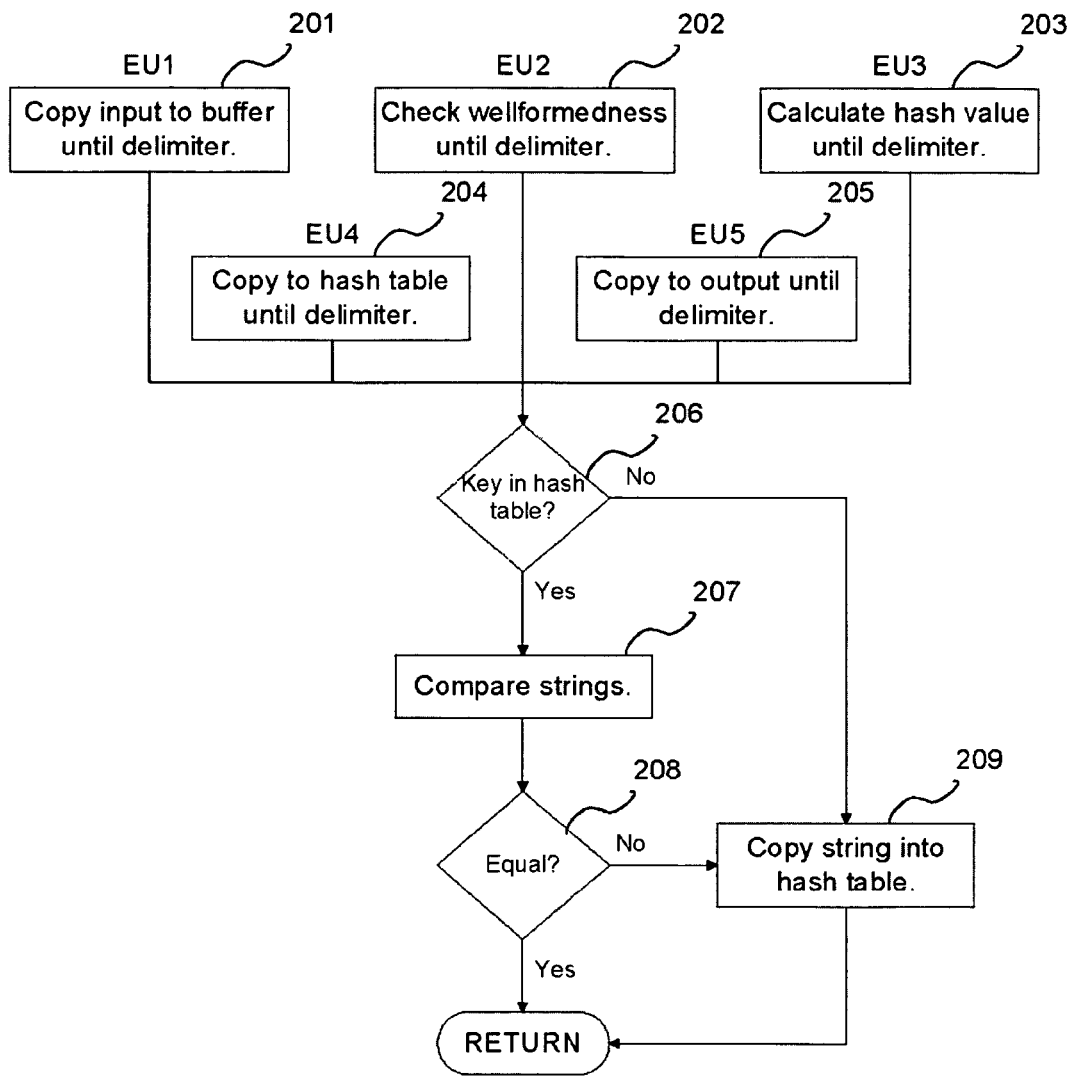
FIG. 2 is a flowchart illustrating an embodiment of a method for parsing XML data or NVP data in software in accordance with the present invention.

FIG. 2 is a flowchart illustrating an embodiment of a method for parsing XML data or NVP data in software in accordance with the present invention. The method uses multiple execution units (ex. EU1-EU5) to perform multiple processing loops in parallel. For example, execution unit EU1 copies input (a string) from an XML or NVP document to a buffer until a delimiter is reached (step 201); execution unit EU2 checks the well-formedness of the string until a delimiter is reached (step 202); and execution unit EU3 calculates a hash value for the string until a delimiter is reached (step 203); execution unit EU4 copies a hash string to a hash table string buffer until a delimiter is reached (step 204); and execution unit EU5 copies the input string to an output until a delimiter is reached (step 205).

Typically, the calculation of the hash value requires more cycles than the other processing loops. Thus with the execution units processing in parallel, the maximum processing cycles are the cycles required by EU3 to calculate the hash. The corresponding cycles in the remaining execution units can then be filled to perform with other operations in parallel, allowing more processing to occur without increasing the number of cycles needed to finish a task.

Once the hash value is calculated, it is determined if the hash value or key is in the hash table (step 206). If so, then the string is compared with the string corresponding to the key in the hash table (step 207). If they are equal (step 208), then the method returns to process the next string. If the strings are not equal, or if the key is not in the hash table, then the string is copied into the hash table (step 209). In one embodiment, the hash string is copied by committing the string copied in the buffer by EU4.

In one embodiment, the method in accordance with the present invention is implemented as a library that is linked in by an application parsing the XML data or NVP data.

Figure 3:
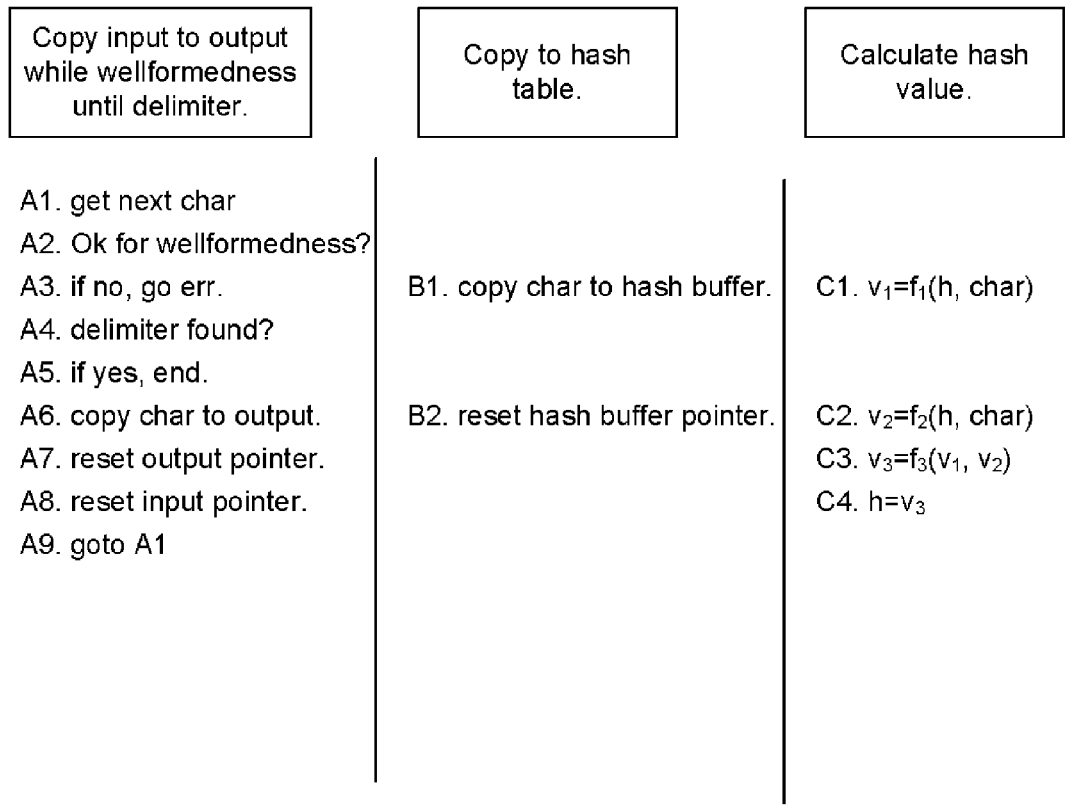
FIG. 3 illustrates an example parsing XML data or NVP data in accordance with the method of the present invention.

FIG. 3 illustrates an example of parsing XML data or NVP data in accordance with the method of the present invention. The left-most column illustrates the instructions performed by EU1, EU2, and EU5. The middle column illustrates the instructions performed by EU4. The right-most column illustrates the instructions performed by EU3. As mentioned above with respect to FIG. 1, note that the boxes showing the operations in FIG. 3 indicate relative starting times of the operations, but not necessarily ending times or operation durations. First, a character from a string within an input stream is copied into a buffer (A1). The character is first checked for maintaining well-formedness of the string (A2). If there's a well-formedness problem, then an error is given (A3). Otherwise, the character is copied to a hash buffer (B1). If a delimiter is found (A4), then the processing loop ends (A5). In the meantime, a hash value calculation for the character begins (C1). The character is copied to the output (A6), the hash buffer pointer is reset (B2), and the hash value calculation continues in parallel (C2). The output pointer is then updated (A7), as well as the input pointer (A8). At the same time, the hash value calculation continues and completes (completing C3 and C4). The processing then returns to A1 for the next character. Note that in the above descriptions, the particular arrangement and relative times of the operations illustrate just one particular example. In general, depending on the particular computational complexity of the operations, the individual operations (such as C1, . . . , C4) may move up or down in the time slices.

Although the present invention is described with the five tasks above, only two or more of these tasks need be performed in parallel to be within the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer implemented method for parsing a document, comprising:
   (a) providing to a scheduler of a central processing unit (CPU) assembly language instructions for the parsing of the document, the assembly language instructions being divided into microinstructions for a plurality of tasks in the parsing of the document, wherein the CPU comprises a plurality of execution units within;
   (b) assigning by the scheduler to a first execution unit a first task wherein the first task comprises microinstructions for a plurality of operations wherein one of the operations comprises:
      checking well-formedness of an input string until a delimiter is reached;
   (c) assigning by the scheduler to a second execution unit a second task wherein the second task comprises microinstructions for a plurality of operations wherein one of the operations comprises:
      copying the input string to an output until a delimiter is reached; and
   (d) assigning by the scheduler to third execution unit a third task of the plurality of tasks wherein the third task comprises microinstructions for a plurality of operations, such that the plurality of operations of the third task are performed in parallel with the plurality of operations of the first task and the second task, wherein one of the operations of the third task comprises:

copying a hash string to a hash table until a delimiter is reached; or calculating a hash value for an input string from the document until a delimiter is reached.

2. The method of claim 1, wherein after the calculation of the hash value, the method comprises:
  (e) determining if the hash value is in the hash table;
  (f) if the hash value is in the hash table, then comparing the input string with a string corresponding to the hash value in the hash table;
  (g) if the input string is equal to the string corresponding to the hash value, then returning to (a) for a next input string; and
  (h) if the input string is not equal to the string corresponding to the hash value, or if the hash value is not in the hash table, then copying the hash string into the hash table.

3. The method of claim 1, wherein the causing (b) and the causing (c) are performed according to an order of operations required by the plurality of tasks in the assembly language instructions.

4. A computer program product comprising a non-transitory computer useable medium having a computer readable program, wherein the computer readable program when executed on a computer causes the computer to:
  (a) providing to a scheduler of a central processing unit (CPU) assembly language instructions for the parsing of the document, the assembly language instructions being divided into microinstructions for a plurality of tasks in the parsing of the document, wherein the CPU comprises a plurality of execution units within;
  (b) assigning by the scheduler to a first execution unit a first task wherein the first task comprises microinstructions for a plurality of operations wherein one of the operations comprises:

checking well-formendness of an input string until a delimiter is reached;
  (c) assigning by the scheduler to a second execution unit a second task wherein the second task comprises microinstructions for a plurality of operations wherein one of the operations comprises:

copying the input string to an output until a delimiter is reached; and
  (d) assigning by the scheduler to third execution unit a third task of the plurality of tasks wherein the third task comprises microinstructions for a plurality of operations, such that the plurality of operations of the third task are performed in parallel with the plurality of operations of the first task and the second task, wherein one of the operations of the third task comprises:

copying a hash string to a hash table until a delimiter is reached; or calculating a hash value for an input string from the document until a delimiter is reached.

5. The product of claim 4, wherein after the calculation of the hash value, the computer readable program:
  (e) determining if the hash value is in the hash table;
  (f) if the hash value is in the hash table, then comparing the input string with a string corresponding to the hash value in the hash table;
  (g) if the input string is equal to the string corresponding to the hash value, then returning to (a) for a next input string; and
  (h) if the input string is not equal to the string corresponding to the hash value, or if the hash value is not in the hash table, then copying the hash string into the hash table.

6. The product of claim 4, wherein the cause (b) and the cause (c) are performed according to an order of operations required by the plurality of tasks in the assembly language instructions.

* * * * *